US007194683B2

(12) United States Patent
Hind et al.

(10) Patent No.: US 7,194,683 B2
(45) Date of Patent: Mar. 20, 2007

(54) REPRESENTING AND MANAGING DYNAMIC DATA CONTENT FOR WEB DOCUMENTS

(75) Inventors: John R. Hind, Raleigh, NC (US); Yongcheng Li, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1334 days.

(21) Appl. No.: 09/798,430

(22) Filed: Mar. 2, 2001

(65) Prior Publication Data

US 2002/0122054 A1    Sep. 5, 2002

(51) Int. Cl.
G06F 17/00 (2006.01)
G06F 15/00 (2006.01)

(52) U.S. Cl. .................. 715/522; 715/513; 715/523

(58) Field of Classification Search ............ 715/513, 715/522, 523
See application file for complete search history.

(56) References Cited

U.S. PATENT DOCUMENTS 6,565,609 B1 * 5/2003 Sorge et al. .............. 715/503
6,643,652 B2 * 11/2003 Helgeson et al. ........... 707/10
6,721,747 B2 * 4/2004 Lipkin .................... 707/10

OTHER PUBLICATIONS http://megginson.com/SAX/sax.html, "SAX 1.0: The Simple API for XML", 1 page.
http://megginson.com/SAX/sax.html, "SAX 2.0: The Simple API for XML", 1 page.

* cited by examiner

*Primary Examiner*—Heather R. Herndon
*Assistant Examiner*—N Hillery
(74) *Attorney, Agent, or Firm*—Myers Bigel Sibley & Sajovec

(57) ABSTRACT

Methods, systems, and computer program products for improving the authoring of dynamic data content for Web documents (such as Web pages) by applying a content management paradigm to the representation, storage, and retrieval of the content. A transformation flow container is defined, which contains one or more transformations. A particular transformation preferably specifies either (1) a generation or retrieval of content or (2) styling for content. In the former case, executable code such as a JavaBean™ may be referenced for invocation. In the latter case, one or more style sheets may be referenced. Upon evaluating the flows in the flow container, an authored document containing dynamic data content results.

14 Claims, 19 Drawing Sheets

301 `<HTML>`

302 `<%@ taglib uri="DynamicData.tld" prefix="DataSource" %>`
       303                            304

305 `<BODY bgcolor="white">`

306 `<H1>Here is the requested information</H1>`

321      322       323    324
`<DataSource:DynamicData name="MyFlowContainer"`
   325  `TargetDocType="htmlTable.dtd">`
   327 `<WebDynamicData>`                    326
   328 `<Transformation type="WebApplication">`
       332`<JspBean>`       334              331
        333 `<Class>test.class</Class>`
        335 `<Properties>`                           337a
          336 `<Indoc name="docin"/>`
          337 `<Property name="AA" value="//formKey[@name="param1"]"/>`
          338 `<Property name="BB" value="//formKey[@name="param2"]"/>`
          339 `<Outdoc target="example.dtd" name="docout"/>`    337b
         `</Properties>`           339a
       `</JspBean>`
   340`<Description>Java code to retrieve XML data</Description>`
   341`<Error>Web application error</Error>`
       `</Transformation>`        351
   329 `<Transformation type="XSLT">`      353
       352`<XSLFamily>ExampleStyleSheetFamily</XSLFamily>`
   350 354`<Error>XSLT transformation error</Error>`
       `</Transformation>`
     `</WebDynamicData>`
   `</DataSource:DynamicData>`

320

360 `</BODY>`
   `</HTML>`

```
<?XML version="1.0">
<!DOCTYPE flowEnvironment SYSTEM "http://xyz.com/dtds/flowDefault.dtd">
<flowEnvironment>
        <runtime>
                <processor>JSP1.1</processor>
        </runtime>
        <request>
                <protocol>HTTP/1.1</protocol>
                <command>GET</command>
                <path>/examples/jsp/custom/custom.jsp</path>
                <Accept>*/*</Accept>
                <Accept-Language>en-us</Accept-Language>
                <Accept-Encoding>gzip, deflate</Accept-Encoding>
                <User-Agent> Mozilla/4.0 (compatible; MSIE 5.5; Windows NT
                    5.0)</User-Agent>
                <Host>ycli2</Host>
                <Connection>Keep-Alive</Connection>
                <Cookie>Xyz=true; CustNum=777</Cookie>
                <htmlFormData>
                  531 <formKey name="param1">value1</formKey>
                  532 <formKey name="param2">value2</formKey>
                </htmlFormData>
        </request>
</flowEnvironment>
```

701 <?xml version="1.0" encoding="us-ascii"?>

<B2B>

<ServiceID>PurchaseOrder</ServiceID>
    <CustomerID>CustomerABC</CustomerID>
    <OrderNumber>12345</OrderNumber>

/720
    <WebData:DynamicData link="http://xyz.com/manage/content/B2B.tfc"
    TargetDocType="http://www.ibm.org/B2B/tpa.dtd">
</B2B>

FIG. 12

```
<HTML>
<BODY bgcolor="white">
<H1>Here is the welcome page</H1>
1210 <FORM method="get"
1212   action="/examples/jsp/custom/custom.jsp">    ←1214
     Here is the input information:
1220 <INPUT type="text" name="param1" value="value1">    ←1222
1230 <INPUT type="text" name="param2" value="value2">    ←1232
</FORM>
</BODY>
</HTML>
```

FIG. 14

```
<?xml version="1.0" ?>
<MyXMLData>
<Item>
  <Name>Parameter1</Name>
  <Value>Value1</Value>
</Item>
<Item>
  <Name>Parameter2</Name>
  <Value>Value2</Value>
</Item>
</MyXMLData>
```

```xml
<?xml version="1.0" ?>
<xsl:stylesheet xmlns:xsl="http://www.w3.org/1999/XSL/Transform" version="1.0">
<xsl:template match="MyXMLData">
  <table>
    <tr>
      <th>Name</th>
      <th>Value</th>
    </tr>
    <xsl:apply-template>
  </table>
<xsl:template>
<xsl:template match="Item">
  <tr>
    <td>
      <xsl:value-of select="Name">
    </td>
    <td>
      <xsl:value-of select="Value">
    </td>
  </tr>
</xsl:template>
</xsl:stylesheet>
```

1510 — first template block (MyXMLData)
1520 — second template block (Item)
1500 — figure

FIG. 16

```
<HTML>
<BODY bgcolor="white">
<H1>Here is the requested information</H1>
<table border=3>
  <tr>
    <th>Name</th>
    <th>Value</th>
  </tr>
  <tr>
    <td>Parameter1</td>
    <td>Value1</td>
  </tr>
  <tr>
    <td>Parameter2</td>
    <td>Value2</td>
  </tr>
</table>
</BODY>
</HTML>
```

1610 (brace around table section)

```
<?xml version="1.0" ?>
<!DOCTYPE taglib PUBLIC " ...... "
     "http://java.sun.com/j2ee/dtds/web-jsptaglib_1_1.dtd">
<taglib>
  <tlibversion>1.0</tlibversion>
  <jspversion>1.1</jspversion>
  <shortname>DynamicData</shortname>
  <uri>http://ycli2.raleigh.ibm.com/taglibs/custom</uri>
  <info>A demo tag library for authoring dynamic data in Web page</info>
  <tag>
    <name>DynamicData</name>
    <tagclass>custom.DynamicData</tagclass>
    <bodycontent>tagdependent</bodycontent>
    <info>Adding dynamic data to Web pages</info>
    <attribute>
      <name>name</name>
      <required>false</required>
      <rtexprvalue>true</rtexprvalue>
    </attribute>
  </tag>
</taglib>
```

FIG. 19
Please select a Transformation Flow Container
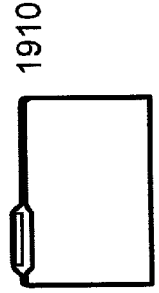 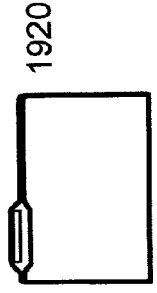 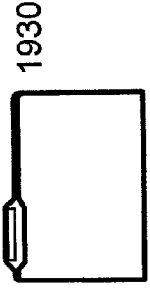
☐ MyFlowContainer  ☐ B2B  ☐ AnotherTransformationFlowContainer

REPRESENTING AND MANAGING DYNAMIC DATA CONTENT FOR WEB DOCUMENTS

BACKGROUND OF THE INVENTION

1. Field of the Invention

The present invention relates to a computer system, and deals more particularly with methods, systems, and computer program products for improving and authoring of dynamic data content for Web documents (such as Web pages) by applying a content management paradigm to the representation, storage, and retrieval of the content.

2. Description of the Related Art

The World Wide Web (hereinafter, "Web") was originally used primarily as a distributed file system in which users retrieved documents (also referred to as "Web pages") having static, predetermined content from remote Web servers and viewed those retrieved documents. Typically, the client device used software such as a Web browser for retrieval and viewing of the documents. In some cases, the user was allowed to update the content of the remotely-stored document, or add content to it. The Hypertext Transfer Protocol, or "HTTP", was (and continues to be) used for exchanging messages of this type between the user's client device and the remote server.

In recent years, the Web has evolved from this distributed file system model into a Web-centered application environment in which the user's browser now functions as the user's interface or portal to applications running within remote Web servers. This new model facilitates dynamic generation of content for Web documents. Including dynamic data content is a key part of Web authoring in today's Web environment. Dynamically-generated content ranges from very simple processing, such as supplying a current date or time in the content of an otherwise static Web page, to content generation that may use processing which is quite complex. As an example of more complex dynamic content generation, information to be included in a Web document may be extracted from a back-end data store by issuing complex queries against a database; by invoking a legacy host application; etc. The Host Publisher software product available from the International Business Machines Corporation ("IBM") is an example of software that may be invoked in response to receiving a user request for Web content, where the generation of that content requires invoking a legacy host application or accessing a relational database.

Currently, there are two ways of generating dynamic data in Web documents. One is to let a program such as a Java™ servlet generate the Web document (including the dynamic content as well as markup language tags). The other is to embed some program code in the Web document for dynamic data generation of content to be included within that document, which is the JavaServer Pages™ approach. A Java servlet is a program written in the Java object-oriented programming language. A servlet is created in a way that allows it to be easily added to the code already running on a server, and is intended to extend the functionality provided by the server. A servlet typically implements code to perform a specific task, such as retrieving information from a particular type of database, performing some business application function, or performing a particular type of transcoding operation. "JavaServer Page", or "JSP", refers to a document encoded in a server-side scripting language. JSPs may be used to create dynamic content using JavaBeans™ and in-line Java scripting in a Web document. The JavaBean(s) referenced by a document may either be passive containers for data (i.e. they do not contain executable code, but instead are populated by other executing code such as a servlet), or they may be active containers which include executable code. What is required when using a JSP is to invoke a Web document (such as a Hypertext Markup Language, or "HTML" page or an Extensible Markup Language, or "XML", document) that contains JSP code embedded within it. The referenced JavaBean or scripting code will then be invoked automatically, by the JSP processing engine, as the Web document is being processed. (As is known in the art, invocation of a Web document is typically done by transmitting an HTTP request message from a client to a Web server, where this request specifies the Uniform Resource Locator, or "URL", used to locate the desired document.) ("Java", "JavaServer Pages", and "JavaBeans" are trademarks of Sun Microsystems, Inc.)

Complicating today's Web-centered application environment is an industry shift away from the perspective of managing and authoring a Web site as if it was a collection of Web documents containing information, and toward the perspective of a site being a managed collection of information which may be presented in various views as authored documents. This shift introduces the notion of a content management system which owns both the collection of information and the authored documents which provide a window onto that information. With this new approach, one can easily assure that the site visitor will see a consistent set of information, regardless of which authored document the information is presented in: gone are the days when a price change, catalog description, licensing agreement, privacy policy, the Webmaster's e-mail address, or other content gets changed on only a subset of the site's pages—causing a nasty customer relations problem at best, or the loss of some significant money at worst on some eCommerce sites.

This new approach means, however, that the traditional authoring environment, where back-end scripting logic is invoked to create the dynamic content for a document, can no longer be used for dynamic data generation. In addition to JSPs executing on a Java-based Web server, as previously described, this traditional authoring environment is exemplified by Active Server Page ("ASP") processors of an Internet Information Server ("IIS") Web server and Common Gateway Interface ("CGI") scripts. JavaServer Pages, Active Server Pages, and CGI scripts were developed to provide high-level abstractions for writing logic to generate dynamic content for Web documents. These may be referred to as "scripting components", and enable content authors to describe how input requests are mapped to back-end application logic, and how the results of that logic are represented in an output response. ASPs are used on Microsoft Web servers to create ActiveX Controls, invoke their methods, and access their properties to generate dynamic content. CGI scripts are a technique which preceded JSPs and ASPs, and provide a simple interface for requesting a Web server to invoke an application program, where that application program typically then generates content dynamically and returns the content to the Web server for delivery to a client.

The drawbacks of the current dynamic content generation techniques include:

Web document presentation is mixed with data generation.

These techniques typically require both the Web document author and the application programmer to work together for creating a particular document, rather than focusing solely on their area of expertise.

Changing the appearance of the Web document sometimes requires modifying and recompiling the Web application.

It is very difficult to make the dynamic data content created using these existing techniques a reusable Web component.

As the authoring environment of a site shifts from a page-managed or document-managed view of information to a content-managed view, the additional indirection (e.g. no longer generating content to fit into a specific place on a specific Web page) breaks many traditional methods of dynamic composition.

Accordingly, what is needed is an improved technique for dealing with dynamic data content which avoids the drawbacks of prior art approaches.

SUMMARY OF THE INVENTION

An object of the present invention is to provide an improved technique for representing and managing dynamic data content which avoids the drawbacks of the prior art.

Another object of the present invention is to provide an improved technique for using dynamic data content in Web documents wherein the generation of the content is separated from its presentation.

Yet another object of the present invention is to provide a technique for using dynamic data content in Web documents that clearly delineates the responsibilities of a Web document designer and a Web content application developer.

A further object of the present invention is to provide a technique that enables dynamic data content for Web documents to become a reusable component.

Still another object of the present invention is to provide a technique that efficiently and effectively supports a Web authoring model wherein a Web site is comprised of a collection of information and Web pages or documents which provide windows onto that content.

Other objects and advantages of the present invention will be set forth in part in the description and in the drawings which follow and, in part, will be obvious from the description or may be learned by practice of the invention.

The present invention will now be described with reference to the following drawings, in which like reference numbers denote the same element throughout.

BRIEF DESCRIPTION OF THE DRAWINGS

FIG. 3 illustrates a sample source document used by the present invention, containing a transformation flow container with two transformations;

FIG. 5 illustrates a sample input document which may be used to convey information about the environment in which a transformation is to operate, according to preferred embodiments of the present invention;

FIG. 7 illustrates an alternative source document format that may be used with the present invention, in which the transformation flows are referenced from a content management system or other repository;

FIG. 12 illustrates another example of an input document that may be used to invoke the dynamic content generation process of the present invention;

FIG. 14 depicts an example of dynamically generated output content resulting from executing the first transformation in the transformation flow container of FIG. 3;

FIG. 15 illustrates a sample style sheet that may used to perform the second transformation in the transformation flow container of FIG. 3;

FIG. 16 shows a sample Web document generated from the transformation flow container depicted in FIG. 3, after both contained transformations have been applied;

FIG. 18 illustrates a sample JSP custom tag definition that may be used for the dynamic content generation process referenced in FIG. 3; and FIG. 19 illustrates an example user interface display of a content management repository from which a Web document author may include transformation flows that specify dynamically-generated document content into an authored Web document, according to an optional aspect of the present invention.

DESCRIPTION OF THE PREFERRED EMBODIMENT

Figure 1:
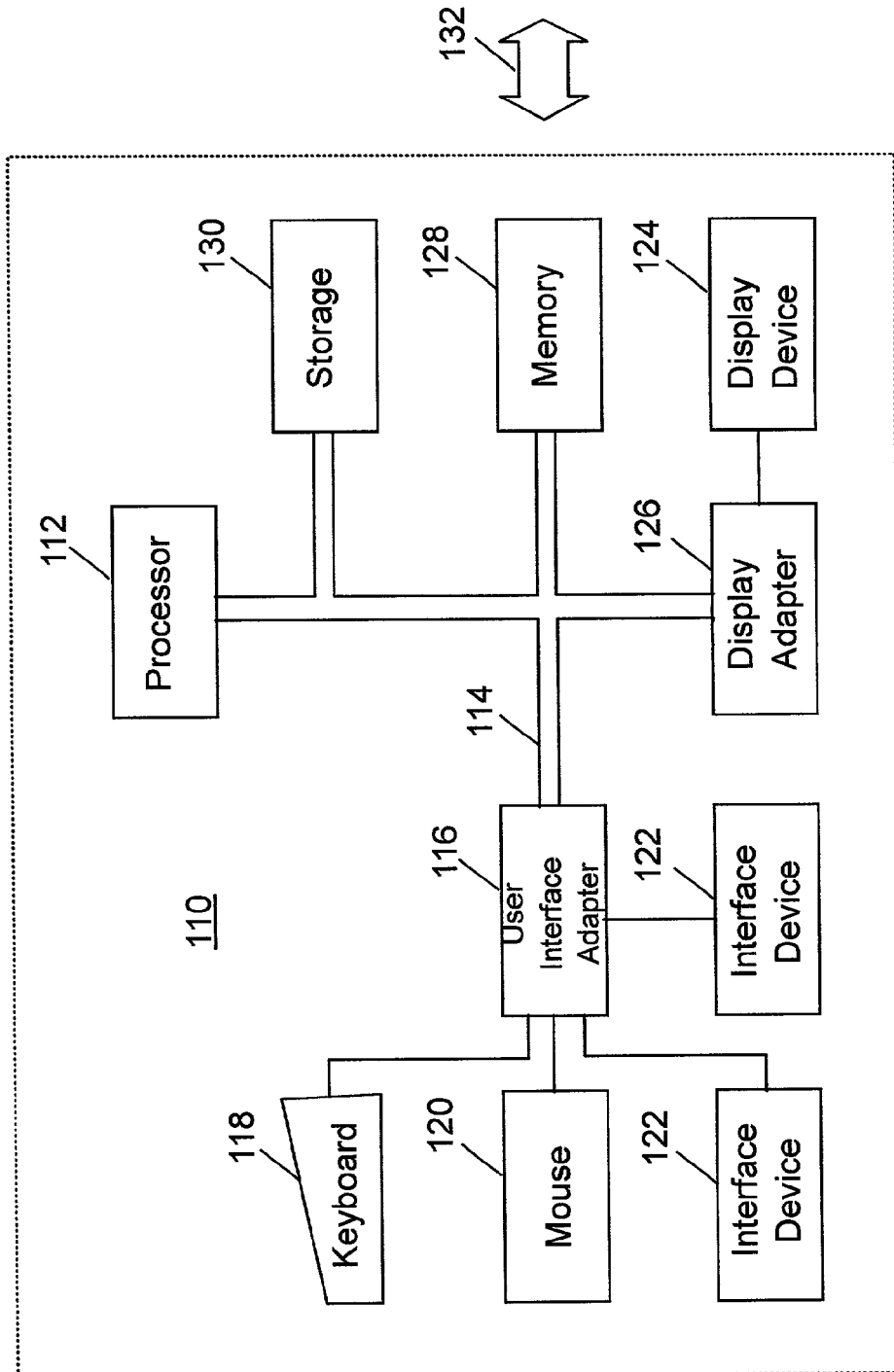
FIG. 1 is a block diagram of a computer workstation environment in which the present invention may be practiced.

FIG. 1 illustrates a representative computer hardware environment in which the present invention may be practiced. The environment of FIG. 1 comprises a representative intelligent workstation 110, such as a personal computer, including related peripheral devices. The workstation 110 includes a microprocessor 112 and a bus 114 employed to connect and enable communication between the microprocessor 112 and the components of the workstation 110 in accordance with known techniques. The workstation 110 typically includes a user interface adapter 116, which connects the microprocessor 112 via the bus 114 to one or more interface devices, such as a keyboard 118, mouse 120, and/or other interface devices 122, which can be any user interface device, such as a touch sensitive screen, digitized entry pad, etc. The bus 114 also connects a display device 124, such as an LCD screen or monitor, to the microprocessor 112 via a display adapter 126. The bus 114 also connects the microprocessor 112 to memory 128 and long-term storage 130 which can include a hard drive, diskette drive, tape drive, etc.

The workstation 110 may communicate with other computers or networks of computers, for example via a communications channel or modem 132. Alternatively, the workstation 110 may communicate using a wireless interface at 132, such as a CDPD (cellular digital packet data) card. The workstation 110 may be associated with such other computers in a local area network (LAN) or a wide area network (WAN), or the workstation 110 can be a client in a client/server arrangement with another computer, etc. All of these configurations, as well as the appropriate communications hardware and software, are known in the art.

Figure 2:
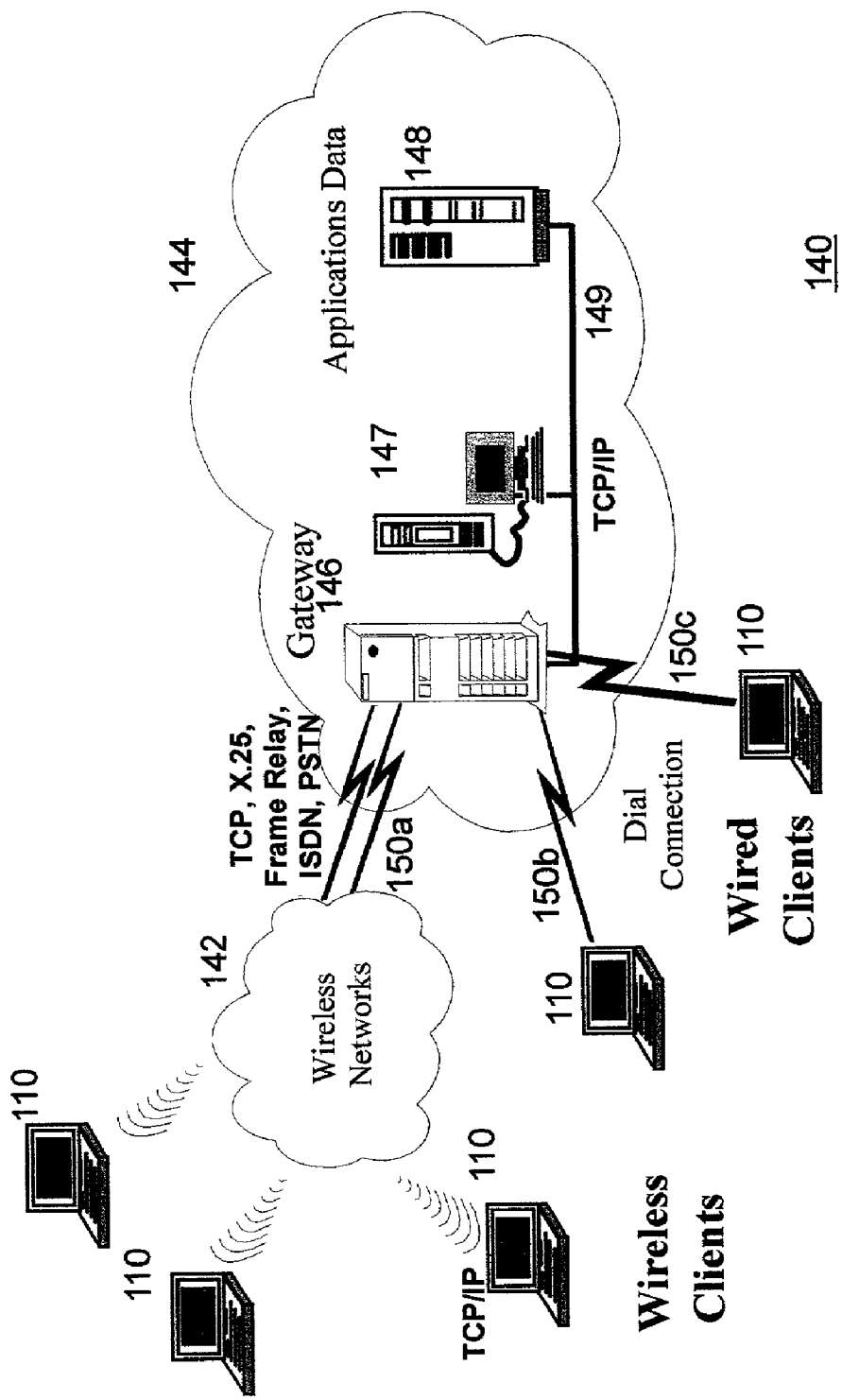
FIG. 2 is a diagram of a networked computing environment in which the present invention may be practiced.

FIG. 2 illustrates a data processing network 140 in which the present invention may be practiced. The data processing network 140 may include a plurality of individual networks, such as wireless network 142 and network 144, each of which may include a plurality of individual workstations 110. Additionally, as those skilled in the art will appreciate, one or more LANs may be included (not shown), where a LAN may comprise a plurality of intelligent workstations coupled to a host processor.

Still referring to FIG. 2, the networks 142 and 144 may also include mainframe computers or servers, such as a gateway computer 146 or application server 147 (which may access a data repository 148). A gateway computer 146 serves as a point of entry into each network 144. The gateway 146 may be preferably coupled to another network 142 by means of a communications link 150a. The gateway 146 may also be directly coupled to one or more workstations 110 using a communications link 150b, 150c. The gateway computer 146 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 146 may also be coupled 149 to a storage device (such as data repository 148). Further, the gateway 146 may be directly or indirectly coupled to one or more workstations 110.

Those skilled in the art will appreciate that the gateway computer 146 may be located a great geographic distance from the network 142, and similarly, the workstations 110 may be located a substantial distance from the networks 142 and 144. For example, the network 142 may be located in California, while the gateway 146 may be located in Texas, and one or more of the workstations 110 may be located in New York. The workstations 110 may connect to the wireless network 142 using a networking protocol such as the Transmission Control Protocol/Internet Protocol ("TCP/IP") over a number of alternative connection media, such as cellular phone, radio frequency networks, satellite networks, etc. The wireless network 142 preferably connects to the gateway 146 using a network connection 150a such as TCP or UDP (User Datagram Protocol) over IP, X.25, Frame Relay, ISDN (Integrated Services Digital Network), PSTN (Public Switched Telephone Network), etc. The workstations 110 may alternatively connect directly to the gateway 146 using dial connections 150b or 150c. Further, the wireless network 142 and network 144 may connect to one or more other networks (not shown), in an analogous manner to that depicted in FIG. 2.

Software programming code which embodies the present invention is typically accessed by the microprocessor 112 (e.g. of workstation 110, of a server such as server 147, and/or of an intermediary such as gateway 146) from long-term storage media 130 of some type, such as a CD-ROM drive or hard drive. The software programming code may be embodied on any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory 128, and accessed by the microprocessor 112 using the bus 114. The techniques and methods for embodying software programming code in memory, on physical media, and/or distributing software code via networks are well known and will not be further discussed herein.

A user of the present invention may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptop, handheld or mobile computers; vehicle-mounted devices; desktop computers; mainframe computers; etc., having processing (and optionally communication) capabilities. The remote server and the intermediary, similarly, can be one of any number of different types of computer which have processing and communication capabilities. These techniques are well known in the art, and the hardware devices and software which enable their use are readily available. Hereinafter, the user's computer will be referred to equivalently as a "workstation", "device", or "computer", and use of any of these terms or the term "server" refers to any of the types of computing devices described above.

In preferred embodiments, the present invention is implemented in software, although embodiments in hardware and/or a combination or hardware and software are also within the scope of the present invention.

The present invention defines a new technique for authoring dynamic data content for use in a Web document. It uses what is referred to herein as a "transformation flow container", or "TFC". A TFC contains one or more transformations, and is specified using a set of markup language tags (which in preferred embodiments are XML-based tags) to describe transformations to be performed. In preferred embodiments, two primary types of transformations are used in TFCs, and specie (1) how the dynamic data is generated and (2) how the data should be presented or "styled" for presentation. This TFC technique completely separates the data generation and the presentation thereof, which allows Web document authors and application programmers to focus on their own jobs. Managing and modifying Web documents with dynamic data content becomes much simpler. The new content management model facilitates reuse of dynamic data content in a Web authoring environment. The TFCs may be stored and managed by a content management system or other repository (referred to hereinafter as a content management system, for ease of reference) in the same way simple raw pieces of information, like the e-mail address of the Webmaster, could be managed in the prior art. Furthermore, the dynamic data content itself may optionally be stored in a cache, from which it is then available for reuse, yielding even greater efficiencies.

A sample TFC which contains two transformations is illustrated in FIG. 3. The source document 300 shown in FIG. 3 may be considered a "template" for creating a rendered output document. (While templates using JSP concepts are illustrated in the examples, any template-oriented document generation technique may be used with the present invention, including but not limited to JSPs, ASPs, and server-side scripting.) In this example, the TFC comprises the markup tags denoted at 320. This example TFC 320 is enclosed in an HTML page 300 (as indicated by the opening tag 301), although TFCs may be embedded in structured documents which use other markup languages as well (such as XML; the Wireless Markup Language, or "WML"; the Simple Markup Language, or "SML"; etc.). A keyword, which for purposes of illustration herein is "DataSource" (as shown at 321), is used for the tag which encapsulates a TFC. Preferably, a qualifier is specified after this keyword; in FIG. 3, the qualifier "DynamicData" has been used (see 322). Optionally, attributes may be specified on the DataSource tag. In the example, a name attribute 323 is specified, and this attribute has a sample value of "MyFlowContainer" 324. Another attribute 325 is also illustrated, which provides information about the target document type that is to result from carrying out the transformations in the TFC. (As will be obvious to one of ordinary skill in the art, the particular syntax used in the examples herein is merely illustrative, and is not intended to limit the invention in any way. Other tag names may be used, and tags having different semantics may be added to or substituted for the tags which are shown, without deviating from the inventive concepts of the present invention.)

The name attribute 323 may be used, for example, by a content management system or document authoring system (as illustrated below with reference to FIG. 19), wherein an identifier is associated with a stored TFC and may be used to retrieve or otherwise reference that stored TFC. In this example, the value of the target document type attribute 325 is specified at 326 as a dialect of HTML which describes a table. This example illustrates identifying the target document by a reference to a stored Document Type Definition, or "DTD", describing a set of allowable markup tags. Alternatively, a URL or other identifier may be used to identify the target document type. Use of the target document type attribute, as well as other techniques for determining the target document type, are discussed in more detail below.

From the Web document author's viewpoint, he merely constructs Web page 300 using a relatively small set of markup language tags to specify the TFC, and thereby creates a Web document which contains a specification of dynamic data content as well as a specification of the styling thereof. (An alternate technique, described below with reference to FIG. 7, enables the Web document author to construct a document by referencing a stored TFC.) The XML tagged information within the TFC 320 in this example specifies a transformation flow comprising two transformations, although in the general case any number of transformations may be specified in a particular transformation flow.

According to the present invention, transformation flows in a TFC are bracketed by a "<Transformation>" tag (see 328 and 329 in FIG. 3). An attribute of this tag then identifies which type of transformation is to be performed. Preferably, attribute values such as "WebApplication" and "XSLT" (see 331 and 351, respectively) are used to indicate a transformation that generates (or, equivalently, retrieves) dynamic data and one that styles the dynamic data. (As stated earlier, these are the two primary types of transformations represented in TFCs.)

An example of the first of the primary types of transformations is illustrated at 330 of the example. This type of transformation specification (referred to hereinafter as a "WebApplication transform") enables easily invoking executable code to perform a transformation. Use of this type of transformation within a particular TFC is optional. Within a type "WebApplication transform", executable code such as a JavaBean may be invoked, as shown by use of the "<JspBean>" tag 332. (Note that the term "transformation", as used by the present invention, includes the case of a "nothing to something" transformation, i.e. a transformation which generates new content.) In this example, the JavaBean to be invoked is denoted as the value of a "<Class>" element 333, and in this example has the name "test.class" 334. The Web application that is used to retrieve dynamic content may have parameters or named properties which represent input and output information, and an optional "<Properties>" tag 335 is used to bracket the specifications of these parameters. Optionally, a description 340 may be provided for explanatory purposes (e.g. to make the TFC self-documenting). An <Error> tag 341 may optionally be used to specify an error message that may be used as an output of a type "WebApplication" transform (for example, when some type of error happens in invoking the JSP application, such as application not found, incorrect parameters, etc.).

Returning now to the Properties element 335 of a type "WebApplication" transform, several different child tags may be specified within a <Properties> tag. The example in FIG. 3 illustrates use of <Indoc> 336, <Property> 337, 338 and <Outdoc> 339 tags, and the example "test.class" invocation 334 is shown as having four properties which are named "docin", "docout", "AA", and "BB" (see reference numbers 336, 339, 337, and 338). Each of these tags will now be described.

The "Indoc" element 336 indicates which named property of the invoked JavaBean should receive the input document, as indicated by the "name" attribute (which has a value "docin" in this example). An optional "type" attribute (not shown in this example) can be used to indicate the kind of document(s) that the invoked JavaBean understands.

The "Outdoc" element 339 identifies the named property of the invoked JavaBean from which the output document generated from the transform will be taken, as indicated by the "name" attribute (which has a value "docout" in this example). The optional attribute "target" shown in this example with the value "example.dtd" is used to indicate the document type of the output.

The "Property" element (see 337, 338) is used to set named properties of the invoked JavaBean to values which will tailor the way the JavaBean performs its function. The "name" attribute is used to identify the property name, and the "value" attribute is used to pass a value which is placed in the named property before the invoked JavaBean is executed. In this example, the invoked JavaBean has two properties named "AA" (see 337) and "BB" (see 338), which in this example are XPATH specifications of where to find input parameters in the "docin" input document named at 336. Since this transform 330 is the first one in the TFC 320, a default document (illustrated in FIG. 5) will be passed as input to the transformation process. (Subsequent transforms use output of earlier transforms as their input, as discussed below with reference to FIG. 6.) Alternatively, the default document may be replaced using a reference to another document which supplies input information.

Figure 4:
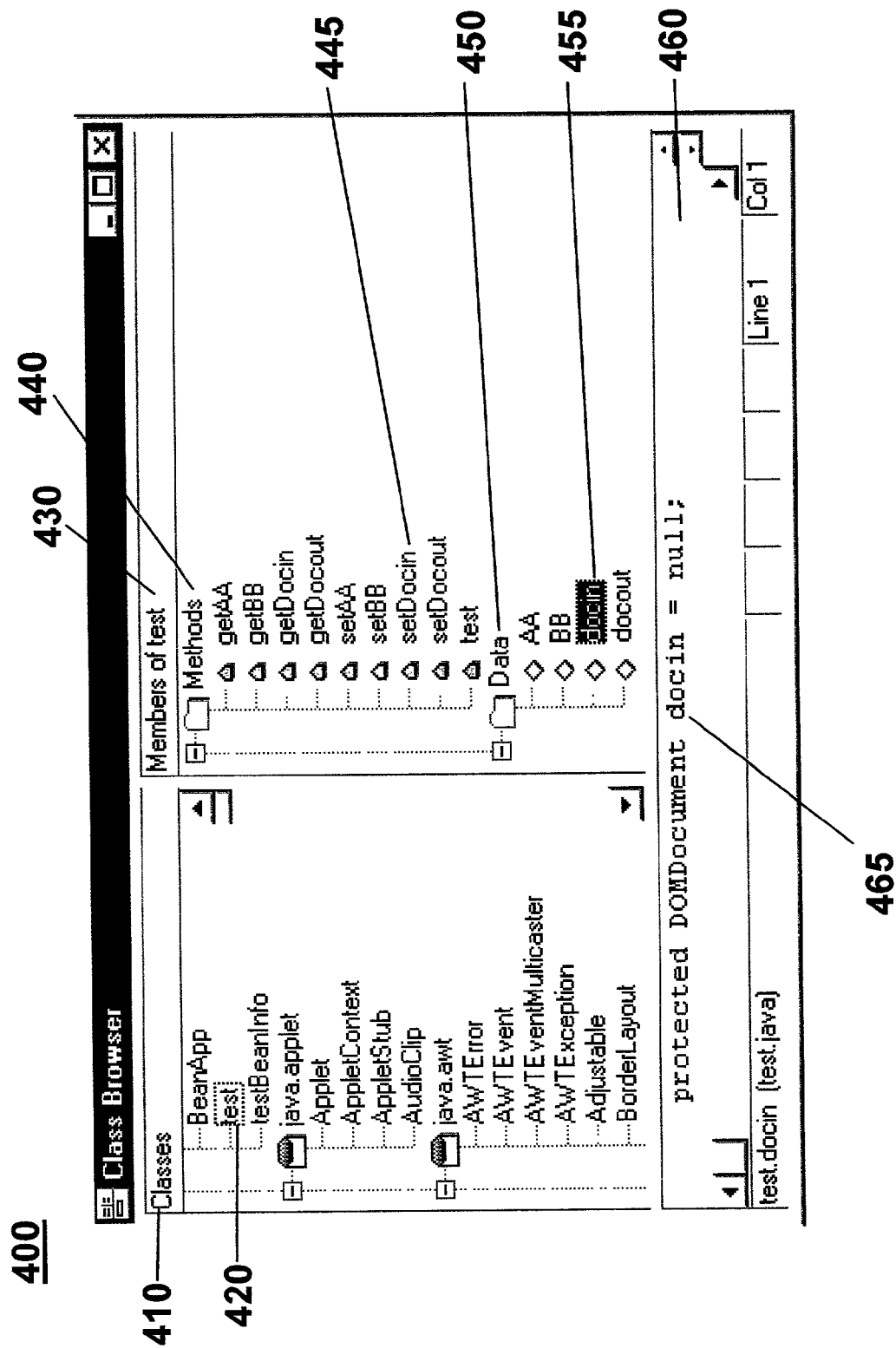
FIG. 4 illustrates how a sample JavaBean that is to be invoked according to the present invention may be displayed by a visual development platform.

FIG. 4 illustrates how the sample "test.class" JavaBean that is to be invoked as a type "WebApplication" transform from the TFC 320 in FIG. 3 may be displayed by a visual development platform. A Web document author may refer to a visual display of this type when creating the <JspBean> markup within the transform 330, in order to determine information about the JavaBean (such as its properties). A "Class Browser" window 400 is illustrated, wherein a user has selected the "test" item 420 in the left sub-window 410 of classes (as indicated by the highlighting at 420). The right sub-window 430 shows the class "properties", which are the data items 450 (such as "docin" 455) along with the methods 440 that are used to get and set values (such as the "setDocin" method 445). The lower sub-window 460 is currently displaying the "initializer" 465 for the selected "docin" data item (shown highlighted at 455), which is a DOM.

Referring now to FIG. 5, a default input document preferably uses an XML format to describe the environment in which a transform flow is being evaluated (including the content of HTTP headers that have been received with the document processing request, which may provide information such as the user agent on the client device and so forth; any received documents; and the system state of the processing environment). This default input document is referred to herein as a "flowEnvironment" (see document 500 in FIG. 5), and includes information (shown at 520) taken from the HTTP request for the page. In the example used herein, the "flowEnvironment" document 500 includes HTML form data 530 (from the browser user pressing the "Submit" button 1330 on the GUI display 1300 in FIG. 13). So, the XPATH values of this example for properties "AA" and "BB" (see the "value" attribute of 337 and 338) identify the HTML form data fields with the names "param1" and "param2" (see 337a, 338a), which are attribute values of the "name" attribute of the "formKey" elements 531, 532.

In preferred embodiments, the Web application invoked from a type "WebApplication" transform generates its result in XML format. Alternative embodiments may generate content in other markup languages, if desired, in which case it will be obvious to one of ordinary skill in the art how to modify the teachings disclosed herein.

Returning now to FIG. 3, the second of the primary types of transformations used in TFCs is illustrated at 350 of the example. This transformation is used for styling the dynamic data content. Transformation specifications of this type are also bracketed by a "<Transformation>" tag (see 329), and use a "type" attribute which has a value "XSLT" (see 351), indicating that the transformation is to be performed by an XSLT processor. Transformations of this type are referred to hereinafter as type "XSLT" transforms. The transformations in the type "XSLT" transform convert the XML document which was created by invoking executable code (e.g. via a type "WebApplication" transform) to a format appropriate for the TFC (which in this example is HTML markup representing a table, as indicated by the DTD specified as the value of the "TargetDocType" attribute at 326). In preferred embodiments of the present invention, XSLT style sheet processing is used for styling dynamic content (although other types of styling transforms may be used alternatively without deviating from the inventive concepts disclosed herein). Note that use of styling transformations in a particular TFC is not strictly required. The style sheet to be used in a particular type "XSLT" transform may be indicated in several manners, which are described in more detail below with reference to FIG. 11. FIG. 3 illustrates one technique, which is to provide a "family name" as the value of an "<XSLFamily>" tag (see 352), where one or more appropriate stye sheets from that family will be determined at run-time. In this example, the style sheet family is identified by the name "ExampleStyleSheetFamily" 353. As another alternative (not illustrated in the examples), a URL or Uniform Resource Indicator ("URI") reference to a style sheet may be specified as the value of a tag such as "<XSLTURI>". As with the type "WebApplication" transform, an error message tag (see 354) may optionally be specified, where the value of this error message may be used as output if the type "XSLT" transform does not execute successfully.

A small amount of static content has been shown in the sample document of FIG. 3, although this is merely for purposes of illustration. A background color is defined at 305, and the text of a heading is provided at 306. Additional static content may precede and/or follow a TFC (for example, additional HTML markup may appear prior to the closing </body> tag 360). In addition, scripting language statements such as JSP processing directives or other dynamic content generation techniques may also be used in a source template if necessary (although the TFCs of the present invention are preferably used for specifying all dynamic data content).

In preferred embodiments, the present invention utilizes the "custom tag" technology of JSPs. Thus, the "taglib" statement shown at element 302 of FIG. 3 is a JSP directive that is used to inform the JSP processing engine where to find the custom tag library (using the "uri" attribute 303) and what prefix is used within this particular markup language document to denote custom tags. The value of the "prefix" attribute 304 indicates that "DataSource" is the prefix used in document 300. (For more information on custom JSP tags, refer to the description titled "JavaServer Pages™ Tag Libraries" at http://java.sun.com/products/jsp/taglibraries.html or "Taglib Directive" at http://java.sun.com/products/jsp/tags/syntaxref.fm8.html.) When TFCs are used in XML documents, the taglib directive uses the syntax "<jsp:directive.taglib uri= . . . prefix= . . . />".

Figure 6:
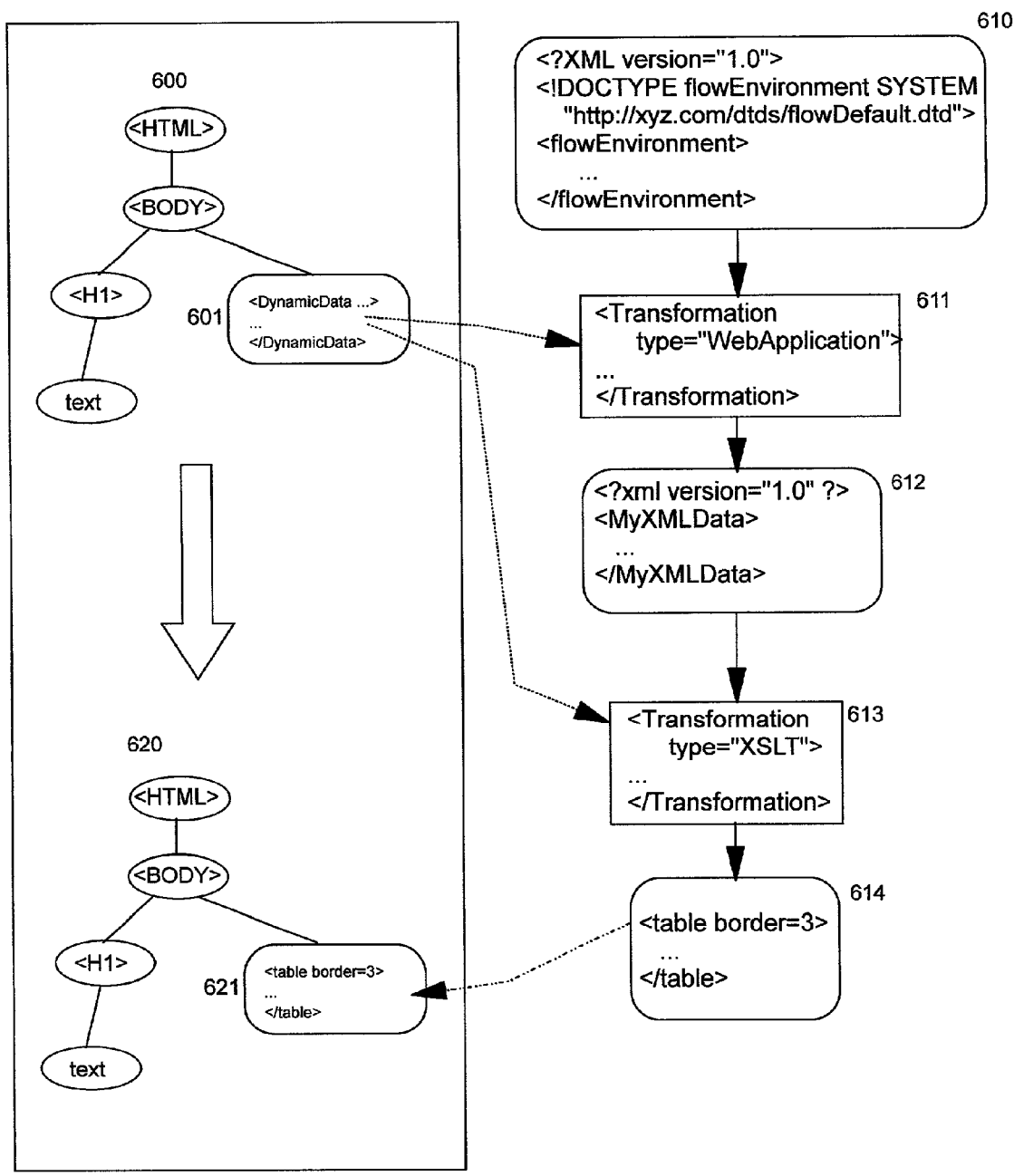
FIG. 6 illustrates a container flow model with which input documents are transformed into Web documents containing dynamic data content, according to preferred embodiments of the present invention.

Turning now to FIG. 6, a container flow processing model which is used by preferred embodiments of the present invention is illustrated. This model shows conceptually how the TFCs of the present invention are transformed, applying each contained transformation until the original TFC (for example, TFC 320 in FIG. 3) is transformed into dynamically-retrieved Web content that replaces the TFC in the authored template (for example, Web page 300 in FIG. 3). An authored Web document (such as Web page 300 in FIG. 3) created according to the present invention may contain one or more TFCs, and the process illustrated in FIG. 6 is performed for each such TFC.

FIG. 6 illustrates the transformation flow (610, 611, 612, 613, 614) of a single TFC sub-tree 601 located in the DOM tree 600 of a template document, which is being evaluated by a scripting engine using techniques of the present invention. In this example, DOM 600 corresponds to template document 300 of FIG. 3. Once a TFC has been evaluated via the transformation flow, its resultant document replaces the sub-tree of the TFC in the DOM. Thus, in FIG. 6, the sub-tree 601 (corresponding to TFC 320) of DOM 600 is replaced by sub-tree 621 in the resulting DOM 620. Since the example template 300 had only one TFC 320 and no other scripting instructions, DOM 620 represents the document which should be sent to the requesting client. As stated earlier, from the perspective of the Web document author, a TFC is a specification of tags and values that uses a small set of markup language tags. Its corresponding sub-tree (such as 601) contains nodes that represent those tags and values. Those markup tags and values are evaluated incrementally, during the transformation flow depicted in FIG. 6. Using the TFC 320 of FIG. 3 as the basis for the flow depiction, it can be seen that the two transform specifications 330 and 350 correspond to the transformation process steps of the flow shown (in abbreviated form) at 611 and 613, respectively. The type "WebApplication" transform 611 receives the default "flowEnvironment" document 610 (an example of which is shown in its entirety in FIG. 5) as input, and (by way of illustration) transforms this to the "MyXMLData" document represented at 612 (which is shown in its entirety in FIG. 14). This document 612 becomes input to the type "XSLT" transform 613, which transforms document 612 into an HTML table document. A sample HTML table document that may result from transform 513 (using rules from a style sheet selected from the style sheet family named at 353 of FIG. 3) is represented at 614. (The markup document 614 is shown in detail at 1610 of FIG. 16.) The tree representation of document 614 then is used to replace the sub-tree 601 (representing the TFC 320) in the DOM 600, thereby producing the DOM 620 with the new sub-tree 621 representing an HTML table.

This replacement may be a physical in-line replacement within the TFC sub-tree of the DOM, as is depicted in FIG. 6, or it may be merely be a logical replacement. Suppose for purposes of discussion that the entire Web document is processed in the manner depicted in FIG. 6. In this case, as the Web document is parsed, an in-memory DOM tree is created, having nodes to represent the document's content. A sub-tree of the DOM thus represents the tags (and tag values) used to specify the TFC, as stated above. As the transforms in the TFC are applied, respective parts of the sub-tree are then physically replaced in the DOM (for example, 621 replacing 601). As an alternative to use of DOM trees, one might simply send the template to the client by way of a filter which would replace TFCs in that stream with the respective serialized results from evaluation of the respective transform flow.

The flow in FIG. 6 (610, 611, 612, 613, 614) id depicted as a series of transforms (611, 613) with intermediary documents like 612 (in stream or DOM format) flowing between them, implying that one transform must complete (e.g., transform 611) before the next (e.g., transform 613) is executed. This serial execution is not a requirement of the present invention, however: an alternative means of flowing data between transforms would exploit an event-based application programming interface ("API"), such as that known as "The Simple API for XML", or "SAX", to allow the transform steps of the TFC flow evaluation to overlap. By extending this same technique into the scripting engine, one can see that multiple TFCs could also be evaluated in parallel. The logical replacement that may occur when using SAX is by alteration of event messages passed between transforms, such that the transforms are being evaluated in a simultaneous fashion: in other words, the TFC sub-tree 601 in FIG. 6 is reduced in a single operation to the final result, as symbolized by 621. This parallel execution technique is discussed in more detail below with reference to FIGS. 9 and 10. (The DOM specification is published as a Recommendation of the World Wide Web Consortium, which is titled "Document Object Model (DOM) Level 1 Specification, Version 1.0" (1998) and is available on the World Wide Web at http://www.w3.org/TR/REC-DOM-Level-1. More information on the SAX API may be found at http://megginson.com/SAX/SAX1/javadoc/packages.html and http://www.megginson.com/SAX/sax.html.)

The general manner in which XSLT transforms operate will now be briefly described.

An XSL style sheet, which is itself an XML document, consists of declarative rules that are applied by the XSLT processor. A typical rule contains a pattern to be matched against the input DOM, and a template (also known as an "action") describing what is to be placed in the intermediate DOM (or in the output document, for an output document which bypasses creation of the intermediate DOM) when that pattern is matched. When applying a style sheet, the patterns in the rules are matched against the syntax of the source document (as represented by the input DOM). When a match is found with the pattern, an output fragment for the intermediate DOM (or output document) is created according to the actions specified in the template (which may include processing additional elements in the source document beyond the matching element and/or generating new data). The template generally includes some markup, some new data, and some data copied out of the tree nodes matched by the rule's pattern, where this information from the template is to be inserted into the intermediate DOM (or output document). The source document is parsed recursively, until no more matching patterns are found. The resulting document fragments are then aggregated to yield a complete intermediate DOM (or output document). It is this rule matching and substitution of different document elements according to the actions in the matching rules that enables style sheets to transform documents. (Refer to "Extensible Stylesheet Language (XSL), W3C Working Draft 21 Apr. 1999" and "XSL Transformations (XSLT), Version 1.0, W3C Working Draft 9 Jul. 1999", which are available on the Web at http://www.w3.org/TR/WD-xsl and http://www.w3.org/TR/WD-xslt, respectively, for more information on using XSL for formatting and transforming documents. The manner in which the pattern matching process creates a new DOM or output document markup is explained in detail in section 2, "Tree Construction".)

Figure 11:
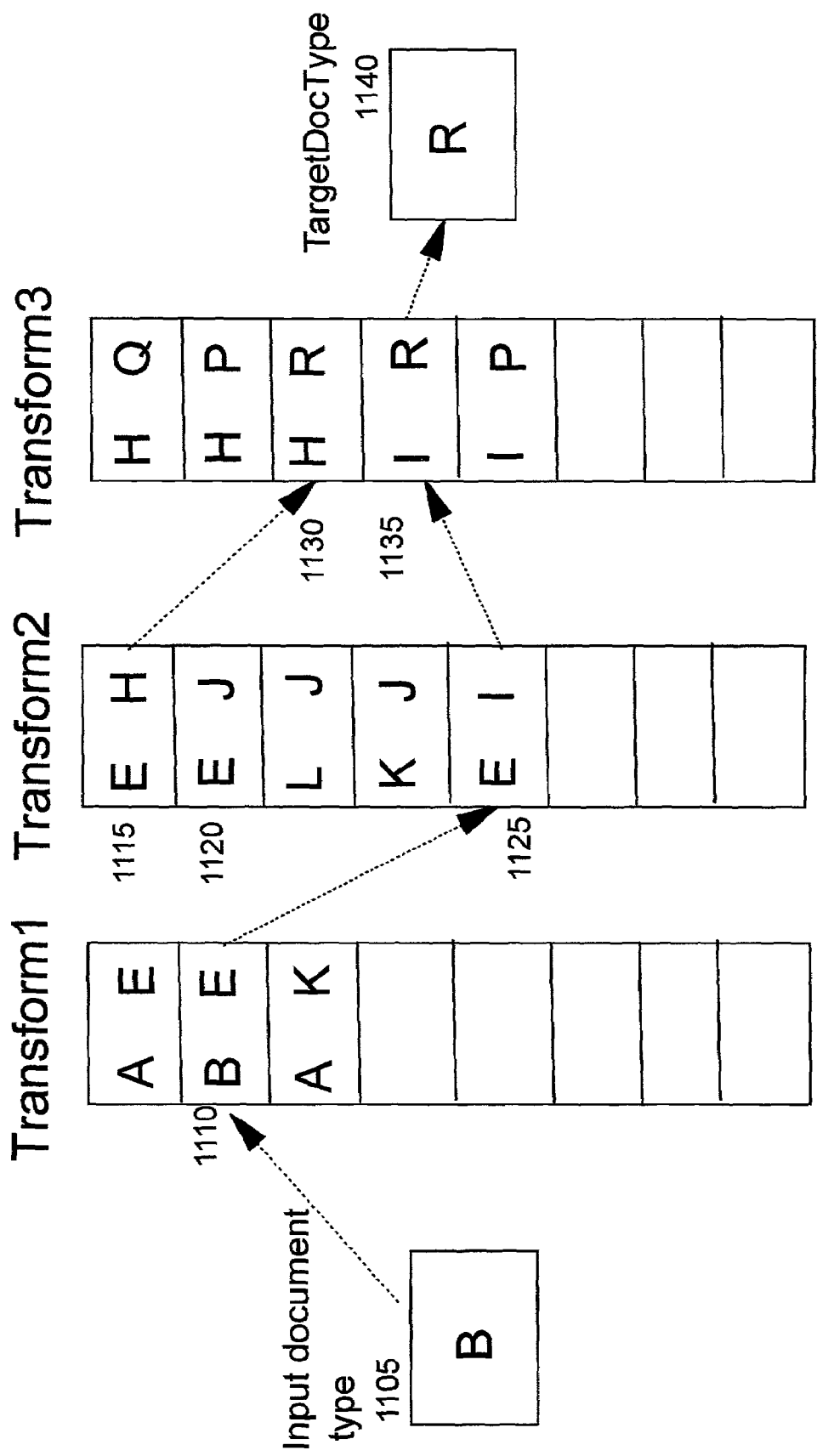
FIG. 11 illustrates a technique that may be used for selecting one or more style sheets to transform or style documents containing dynamically-generated content, according to an optional aspect of the present invention.

It is instructive to note that (1) an XSLT transform may fire a pattern which produces a result without consuming any input, and (2) an XSLT style sheet may contain application code references which produce nodes that augment the nodes from the document being styled, and hence these produced nodes may also be styled by the pattern engine. This means that an XSLT transform used with the present invention can operate on a container of complex data (such as a catalog entry), or a script which performs back-end application execution (such as the means by which a Web service is performed). The XML-based markup tags introduced by the present invention for use in Web documents (as shown in FIGS. 3 and 7) are believed to be conceptually easier for the Web document author to understand than requiring knowledge of XSLT syntax. Refer to FIG. 11, below, for information on selecting style sheets for use with the present invention.

FIGS. 13–16, discussed below, provide an example showing how the TFC of a particular input document is transformed until it is completely replaced by a result of its contained transformations.

Note that while the TFC 320 shown in FIG. 3 is represented using in-line content, container flow processing analogous to that shown in FIG. 6 occurs for a TFC that is retrieved from a content management repository using a reference link from a <DataSource> tag. (See 720 of FIG. 7 for an example reference link.) As stated earlier, a particular source template may contain one or more TFCs (either in-line, as reference links, or a combination thereof). The dynamic flows of the container flow model processing may be performed when a template is being resolved (e.g. at a Web server), or in alternative embodiments they may be left in the output of the template evaluation for later resolution (e.g. upon arriving at an edge server or other network intermediary device).

The template in FIG. 7 illustrates an alternative syntax format that may be used with the present invention, in which a TFC used to specify dynamic data is retrieved using a reference link to content stored in a content management system. This example document 700 is encoded using XML, as indicated by the tag at 701. Document 700 contains XML markup tags and values which, for purposes of illustration, specify processing of a customer order in a business-to-business eCommerce application. This reference link syntax 720 is an alternative to specifying transformation flows for the content generation and styling processes in-line, using the <WebDynamicData> syntax shown at element 327 of FIG. 3. In preferred embodiments, the link attribute 720 takes as its value a URL or URI.

From the example Web documents shown in FIGS. 3 and 7 and the container flow processing model in FIG. 6, it can be seen that, by using the techniques of the present invention:

No Java code is included in the Web document.

The Web application deals only with data retrieval, and generates its result in a markup language format (preferably XML, as stated earlier). The Web application does not need to worry about how the result is rendered—e.g. whether it will be rendered in HTML or WML pages.

The dynamically-generated Web data content is treated truly as a block of data (see element 614 of FIG. 6, wherein this "data block" is being inserted into a DOM 620) instead of a piece of programming language code or the mix of programming language code and rendering tags. The TFC which is used to dynamically generate a block of data may be considered as yet another type of data block. Therefore, it is much easier to implement a content management model whereby reusable components are provided for dynamic data—for example, to drag-and-drop a block markup such as that shown at 320 of FIG. 3 from a GUI menu in a traditional Web authoring tool (an example of which is illustrated in FIG. 19).

At run-time, the styled dynamic data (such as 614 of FIG. 6) can optionally be cached and shared by different authored Web documents.

The block containing the TFC may reside as if it were simple raw information within a content management repository, from which it may be retrieved and injected into an authored document at run-time like any other managed content. With it's styling able to dynamically react to the document's format (e.g. being injected into an HTML page, or an XML document, etc.), the page author, information manager, and application programmer are no longer locked into an interdependent tangled mess.

Figure 8:
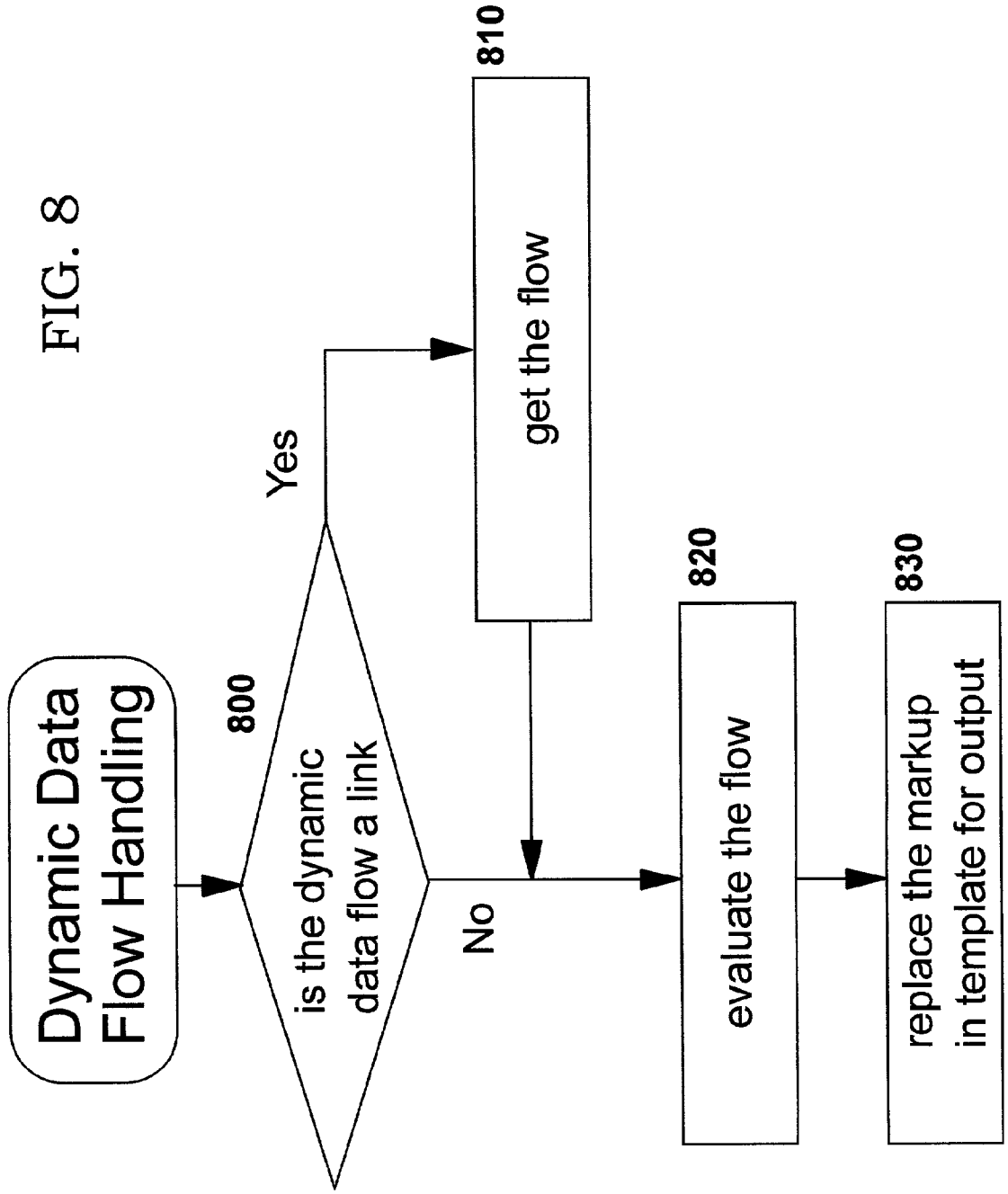
FIGS. 8–10 provide flowcharts depicting logic which may be used in implementing preferred embodiments of the present invention.
Figure 9:
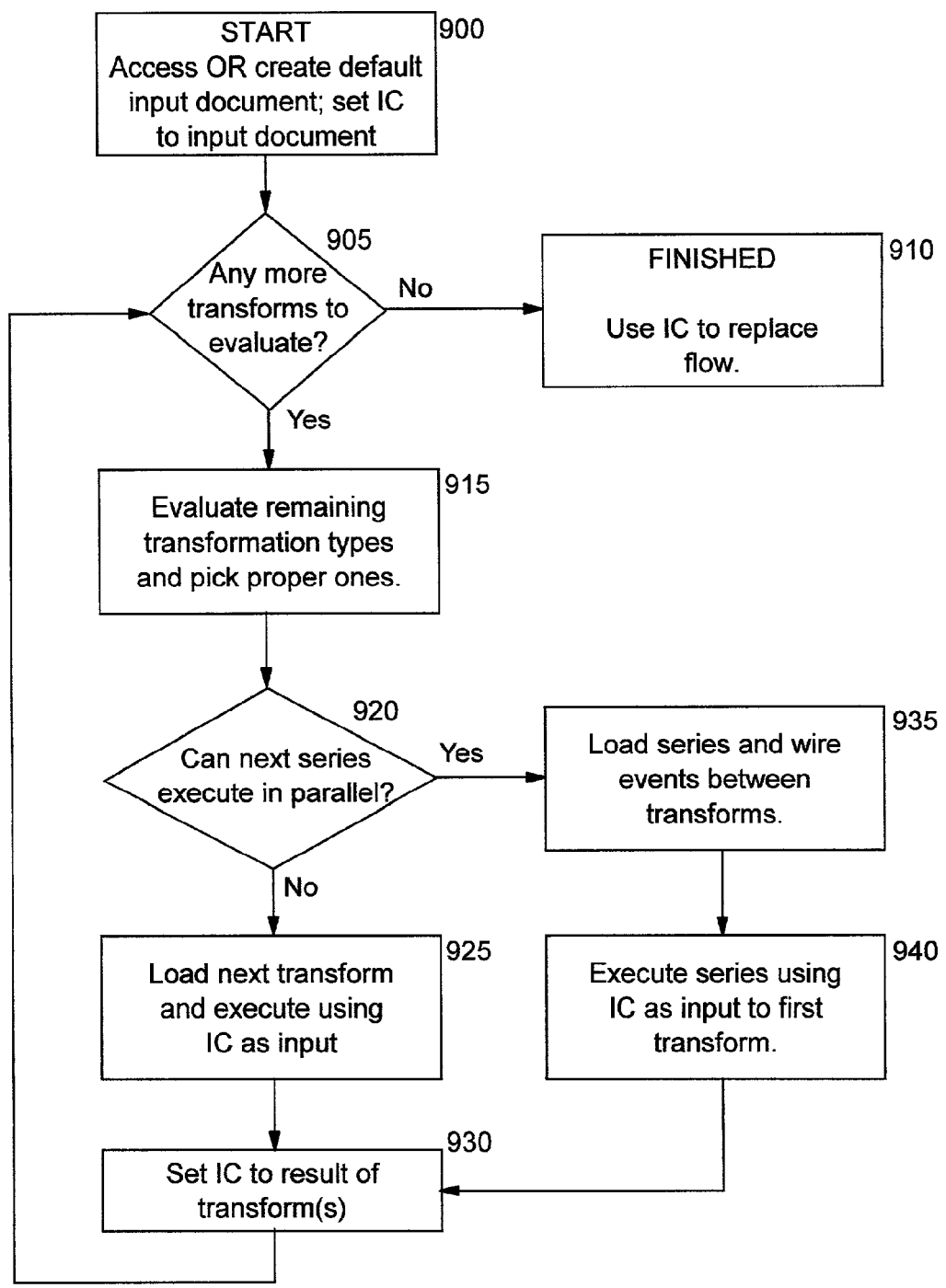
Figure 10:
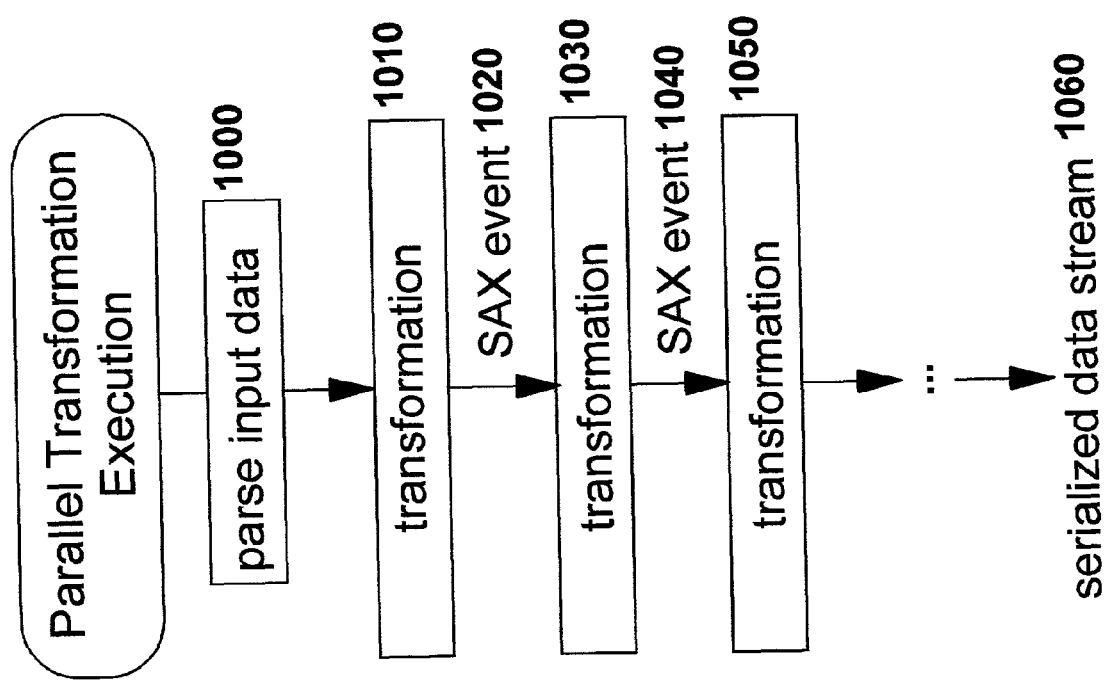

The flowcharts in FIGS. 8–10 provide logic that may be used in implementing preferred embodiments of the present invention. The logic in FIG. 8 corresponds to processing the flows in the TFC as depicted generally in FIG. 6. Upon encountering a <DataSource> element in a template, Block 800 asks whether the reference link format (illustrated at 720 of the example in FIG. 7) has been used. If so, then at Block 810, the TFC is retrieved from the content management system, after which processing continues at Block 820. At Block 820, the flow (which is now treated as an in-line flow, regardless of whether the format shown in FIG. 3 or the format in FIG. 7 was used) is evaluated, and the result is used to replace the markup in the template at Block 830.

Logic that may be used for the flow evaluation process of Block 820 is described in more detail in FIG. 9.

At Block 900 of FIG. 9, a default input document is either accessed (if available) or created (see FIG. 5 for an example), and a variable "IC" is set to reference this default input document. Block 905 checks to see if there are any more transformations of the current TFC to be evaluated. If all transformations for this TFC have been evaluated, then in Block 910 the flow in the TFC is replaced by the data referenced by variable IC, and the processing of FIG. 9 ends.

Otherwise, Block 915 evaluates the remaining transformations in this TFC. In some cases, one or more transformations in a TFC may have an unknown output type, such that it is not possible to determine the final path to a result document until some subset(s) of the transformations have been performed. Thus, the logic of FIG. 9 enables determination of series of transformations, and application of the transformations in these series, until evaluating all of the transformations in the TFC. Block 915 therefore determines the next series of transforms to be applied. The TFC may contain zero or more type "WebApplication" transformations (such as that illustrated at 320 of FIG. 3), as well as zero or more type "XSLT" transformations (such as that illustrated at 350 of FIG. 3). The appropriate transformations to be performed are determined by checking the "type" attribute on the <Transformation> tags of the TFC. When a content-generating transformation such as a JavaBean invocation is to be performed, the JavaBean code is located. If style sheets are to be selected for performing styling transformations, then those style sheets must be determined, (The manner in which style sheets may be selected from a style sheet family in described in more detail below, with reference to FIG. 11. If a style sheet is identified using a URI, then that style sheet is retrieved.)

Block 920 tests to see if the next series of transformations selected in Block 915 can be executed in parallel. The flow model depicted in FIG. 6 is a serial flow model, wherein the output of one flow may be used as input to the next flow. It is possible, however, to execute transformations that overlap—e.g. when using SAX events, as discussed above. Typically, the transformation performed by a JavaBean will execute as a serial transformation (unless the JavaBean is written to be adaptable to parallel transformation), while an XSLT processing engine may operate in parallel (i.e. by evaluating rules from one style sheet against the data that is available, which may cause SAX events to fire, thereby triggering evaluation of rules from other style sheets).

If it is determined that parallel execution can occur for the next series, then at Block 935 the processing engine loads the style sheets and wires events between those style sheet transformations, after which Block 940 executes this series using the data referenced by variable IC as the input to the first transform, and evaluates the style sheet rules iteratively against the available data. This process is depicted in more detail in FIG. 10. When parallel execution is not being done, then as indicated at Block 925, the next transform in the series is loaded and executed using the data referenced by variable IC. After the processing of Block 925 or 940, Block 930 sets variable IC to the result of the transform, and control returns to Block 905.

As shown in FIG. 10, the parallel transformation process used by the present invention begins by parsing the input data (Block 1000), and applying a transformation (Block 1010) based upon matching a rule in a selected style sheet. This may cause a SAX event to fire (see 1020), where the result of the firing leads to matching another rule and therefore performing another transformation (Block 1030).

This transformation may cause yet another SAX event to fire (see 1040), leading to yet another transformation (Block 1050). This process may repeat a number of times, until no more rules match; at that point, a serialized data stream is available as output of the transformation process (as indicated at 1060).

If a transformation family is specified in the Web document as the value of a <XSLFamily> element in the TFC, then it may be necessary to choose one or more style sheets from that family at run-time in order to style the document content that is input to the type "XSLT" transform. The first selected style sheet is preferably determined based upon the type of the input document (see 339a of FIG. 3)—and/or may be implied by careful structuring of style sheet families, and the last style sheet is preferably determined based upon the desired output document type (see 325, 326 of FIG. 3). Remembering that an XML document is self-describing, the availability of an input document means that the type is known. (For example, an XML document typically begins with an "<?xml version= . . . ?>" tag.) This means that to complete the transformation in the general case, it is necessary to know the desired output type in order to select the style sheet(s) required to complete the transformation. The present invention contemplates three ways in which this may be done.

First, it may be possible to deduce the output document type from the characteristics of the next stage in the flow. For example, the last transformation in each flow may be deduced from the type of the template in which the TFC was embedded or referenced. As an example of this technique, the <html> tag 301 in FIG. 3 indicates that the TFC 320 is being embedded within an HTML page, so it may be presumed that the final result of the transformations should be expressed using HTML markup. Or, the last transformation may be determined from the optional TargetDocType attribute on the <DataSource> tag, as shown at 325, 326 of FIG. 3. When a type "WebApplication" transform is to be processed, it may be possible to deduce the required output type of a transform that occurs before executing an invoked JavaBean from the application specification (e.g. by interrogating properties of the JavaBean).

As a second technique for determining which style sheet (s) to apply, the flow author may provide one or more "hints" with the type specification. U.S. Pat. No. 6,463,440 , (filed Apr. 8, 1999), which is titled "Retrieval of Style Sheets from Directories Based Upon Partial Characteristic Matching", teaches a technique whereby information about the applicability of style sheets to particular uses (i.e. the characteristics of the style sheet) may be stored and used by a search engine to locate style sheets that may be appropriate for use in a particular situations. Preferably, the hints provided by the flow author are specified as one or more name/value pairs within <Hint> tags (not illustrated in the examples) within the <Transformation> element for a type "XSLT" transform in the TFC. For example, the dynamic content generated by a type "WebApplication" transform may have gathered current news items from a Web news site named "XYZ News". The Web application may be adapted to clipping out particuiar items of interest to a user, for example, where these items are then to be formatted and displayed on the user's client device. Suppose a type "XSLT" transform is to be applied for creating the proper formatting tags (and perhaps performing other styling, such as pruning the content beyond what has been performed by the Web application). Further suppose there are two style sheets available to choose from, and the defined characteristics for one indicate that it is adapted to styling news articles from site XYZ_News and formatting the articles into tables, while the characteristics for the second style sheet indicate that it is adapted to styling news articles in general and formatting them as HTML paragraphs. If the hint provided by the Web document author indicates that HTML tables are desired, then the search engine disclosed in U.S. Pat. No. 6,463,440 will select the first style sheet, because it is a better match.

As a third technique for determining which style sheet(s) to apply, ordering or "chaining" within the style sheet family for the subset of sheets handling the input type may be used. This technique is depicted graphically in FIG. 11, where it is known that a transformation or series of transformations must be applied to transform an input document of type "B" (see element 1105) into an output document of type "R" (see element 1140). For purposes of illustration, suppose there are no "B to R" style sheets available. Thus, it may be necessary to determine a series of style sheets that may be applied, each generating an intermediate document type, in order to perform the "B to R" transform. In the example shown in FIG. 11, the only style sheet that operates on documents of type "B" is the style sheet represented by element 1110, which creates an output document of type "E". Several style sheets are available for operating on documents of type "E", as shown at elements 1115, 1120, and 1125. However, none of these yields a document of type "R". By selecting either style sheet 1115 or 1125, however, output type "R" can be obtained by application of one further style sheet—either style sheet 1130 or 1135. Thus, either the sequence (1) B to E, E to H, H to R, R to B or the sequence (2) B to E, E to I, I to R, R to B may be applied. Concepts of graph theory (which do not form part of the present invention) may be used to design algorithms to perform a selection process of this type. Reference may also be made to U.S. Ser. No. 09/288,838, filed Apr. 8, 1999 (now abandoned), which is entitled "Achieving Complex Transformations with Dynamic Style Sheet Coalescing", which defines a technique for dynamically selecting one or more style sheets and then coalescing them into a single style sheet, where the selection is based on values of dynamically-changeable factors (such as the target environment in which a document is to be rendered) and is optimized for the source document type and the target environment.

Figure 13:
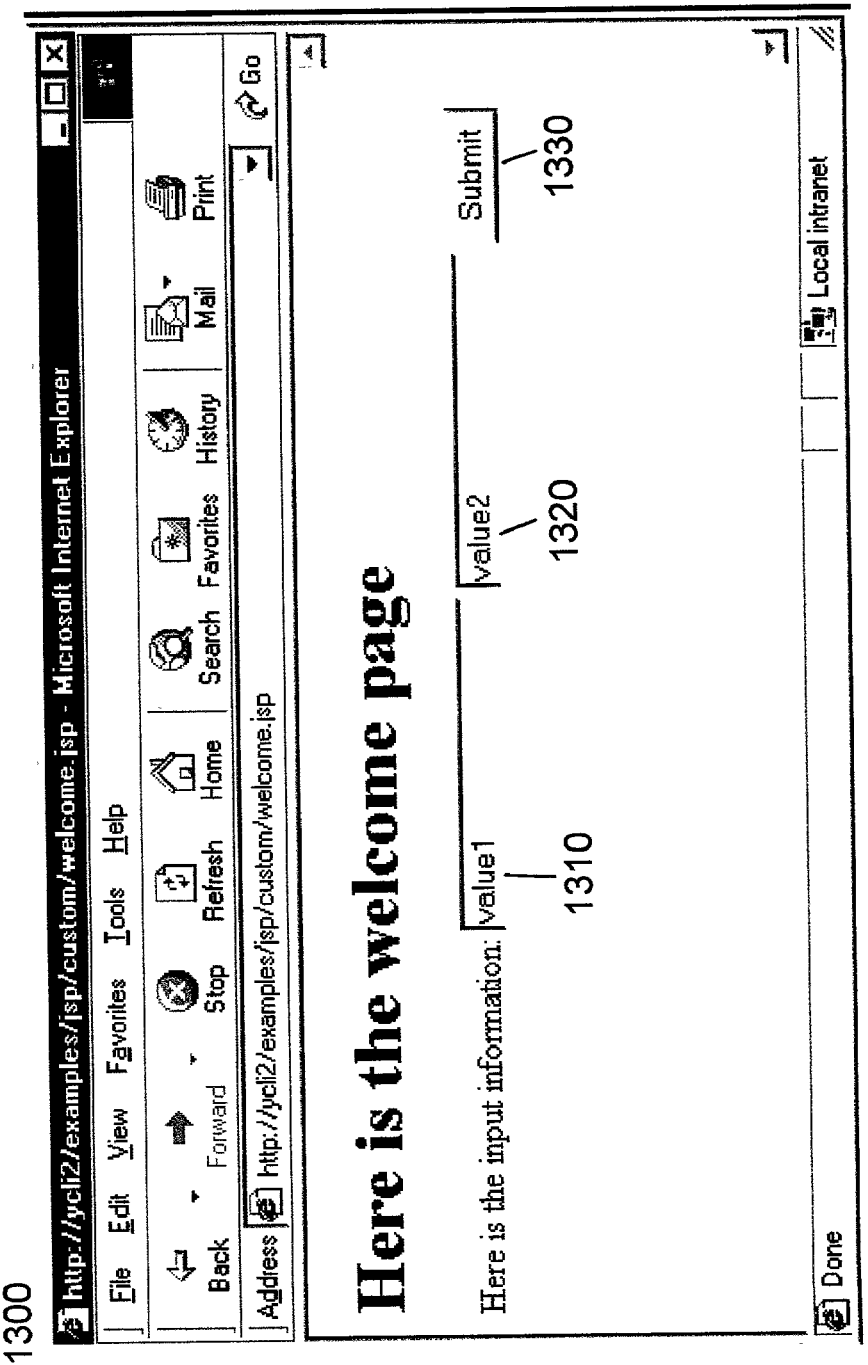
FIG. 13 shows an example graphical user interface ("GUI") representation of the input document of FIG. 12, and may be used to accept user input for dynamic content generation.

The input to a type "WebApplication" transform within a TFC may require values for properties (i.e input parameters) of a JavaBean, as has been stated. In this case, a means for obtaining those values must be provided. FIGS. 12 and 13 illustrate an example of how input parameter values may be obtained for the JavaBean to be invoked from the TFC 320 of FIG. 3. In FIG. 12, input page 1200 is used to generate the data entry GUI window 1300 shown in FIG. 13. The <FORM . . . > tag 1210 references a JSP which may be found at location "/examples/jsp/custom.jsp" (see element 1214), and which for purposes of illustration provides a reference to the template 300 of FIG. 3. The <INPUT . . . > tags 1220 and 1230 provide a means for the GUI window 1300 to accept input values (and provide default values as well, as shown at 1222 and 1232). Upon processing the action attribute 1212, the JSP compiler invokes the referenced JSP and passes the parameter types, names, and values from the form (after first receiving the user's input for fields 1310 and 1320 of window 1300). The processing illustrated by FIGS. 12 and 13 is known in the prior art. The document 300 shown in FIG. 3 then receives these input parameters using the XPATH technique which was described earlier with reference to FIG. 3, and as the type "WebApplication" transform 320 executes, it then forwards the received parameter values to the JavaBean (which in this example is named "test.class", as shown at 324 of FIG. 3).

Figure 17:
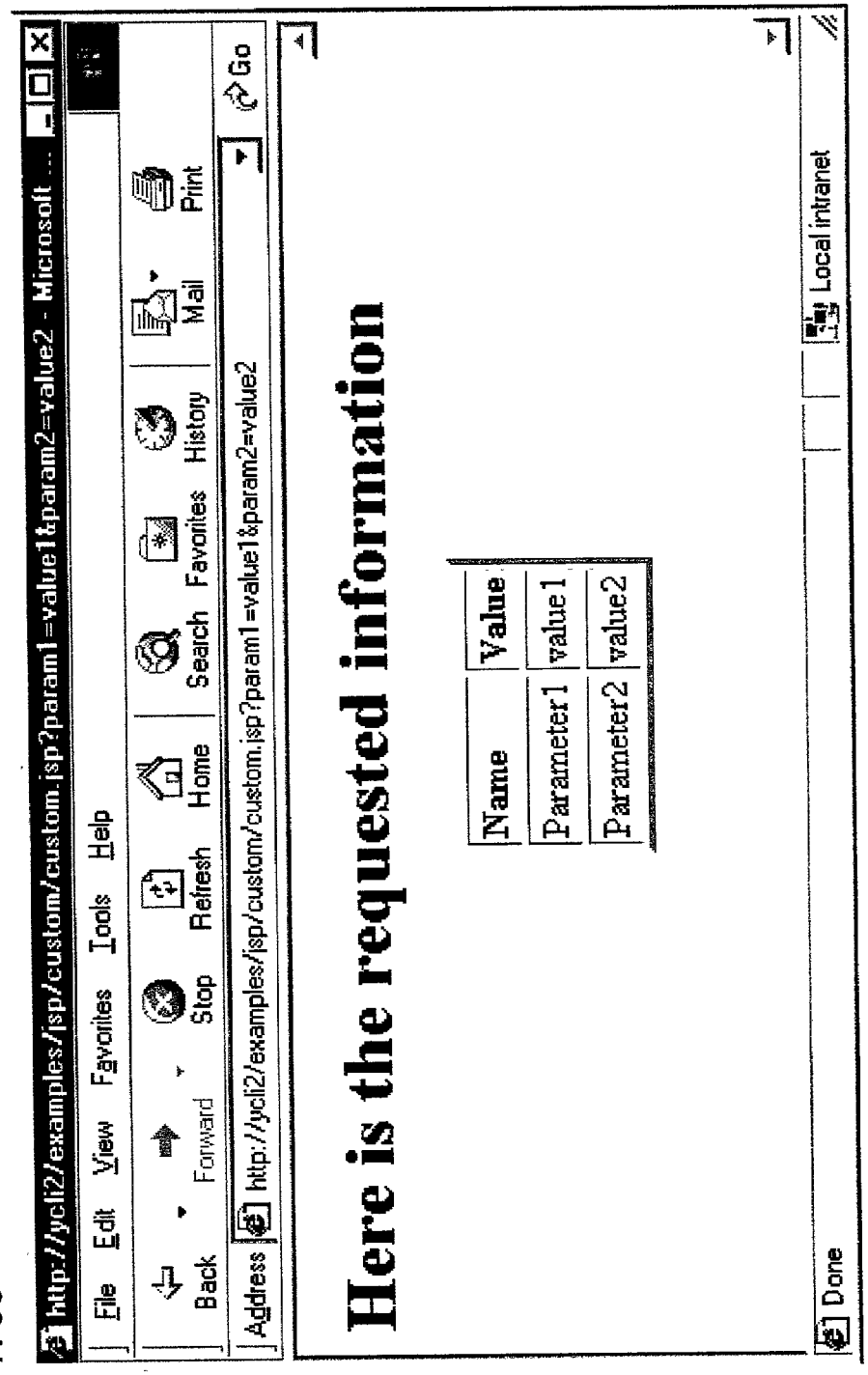
FIG. 17 depicts an example of a GUI display showing a rendering which corresponds to the Web document shown in FIG. 16.

Continuing with the example in FIG. 3, FIG. 14 illustrates a sample XML document 1400 that may be dynamically generated by the Web application "test.class" that is invoked (see 334) from the TFC of FIG. 3. This document 1400 is represented in FIG. 6 at 612, and is input to a styling transform 613. FIG. 15 illustrates a style sheet that may be selected from the style sheet family named at 353 to perform the styling transform. As can be seen by inspection, the action of the first rule of this style sheet 1500 creates a table having columns for a Name and Value (see 1510), and the action of the second rule then formats rows of this table to contain the information taken from <Name> and <Value> tags of the document being styled (see 1520). A sample HTML table document that may result is shown in detail at 1610 of FIG. 16. This HTML table markup 1610 is represented in FIG. 6 at 614, as the output of styling transform 613. Thus, the HTML page shown at element 1600 of FIG. 16 represents the transformed result of applying the TFC 320 in FIG. 3 (where the table markup 1610 has replaced the TFC 320 in-line within it containing template 300). A rendered version 1700 of the HTML page 1600 is depicted in FIG. 17.

FIG. 18 illustrates a taglib definition 1800 that may be used to define a custom tag to be processed for use with the present invention. In this example, the tag "DynamicData" is defined (see elements 1810 and 1820). This definition comprises, inter alia, a reference to code implementing this tag (see element 1830). The details of defining custom tags are well known to those of ordinary skill in the art, and will not be described herein.

FIG. 19 illustrates an example user interface display of a content management repository from which a Web document author may include one or more TFCs in order to use dynamically-generated document content in an authored Web document, according to an optional aspect of the present invention. This example illustrates the presence of three stored TFC data blocks 1910, 1920, 1930 which may be selected.

As has been demonstrated, the present invention provides advantageous techniques for representing, storing, and managing dynamic data content for Web documents, which avoids drawbacks of prior art techniques. Note that where reference is made herein to using XML, this is intended to encompass other similar notations such as WML which may be parsed and represented using DOM trees and/or operated upon using the SAX API. Similarly, although the preferred embodiment has been described as using XSL style sheets and an XSLT processor, style sheets and processors using other notations may be used instead (e.g. Document Style Semantics and Specification Language, or DSSSL, which is an International Standard ISO/IEC 10179: 1996) without deviating from the inventive concepts of the present invention.

While preferred embodiments of the present invention have been described, additional variations and modifications in those embodiments may occur to those skilled in the art once they learn of the basic inventive concepts. Therefore, it is intended that the appended claims shall be construed to include both preferred embodiments and all such variations and modifications as fall within the spirit and scope of the invention.

What is claimed is:

1. A method of improving authoring of Web documents, comprising:

specifying a transformation flow container ("TFC") which represents at least one data retrieval transformation and a plurality of data styling transformations;

including the specified TFC in an authored Web document; and selecting a data styling transformation among the plurality of data styling transformations to be applied to data retrieved by the data retrieval transformation.

2. The method according to claim 1, wherein a selected data retrieval transformation is a JavaBean invocation syntax.

3. The method according to claim 1, wherein a selected data styling transformation is a style sheet reference.

4. The method according to claim 1, further comprising evaluating the authored Web document, wherein the evaluation causes the transformations in the TFC to be applied.

5. The method according to claim 1, further comprising the step of evaluating the authored Web document, wherein the transformations in the TFC are left in place for subsequent application.

6. The method according to claim 1, wherein the TFC is specified using a structured markup language notation.

7. The method according to claim 6, wherein the structured markup language notation is a notation known as "the Extensible Markup Language notation".

8. A computer program product for authoring a web document, the computer program product embodied on one or more computer-readable media and comprising:

computer-readable program code that is configured to define the Web document as comprising a template and a transformation flow container specified in the template, wherein the transformation flow container comprises at least one data retrieval transformation and a plurality of data styling transformations; and computer-readable program code that is configured to select a data styling transformation among the plurality of data styling transformations to be applied to data retrieved by the data retrieval transformation.

9. A dynamic content retrieval and presentation mechanism, comprising:

a first specification for invoking a data content retrieval operation;

a second specification for selecting among a plurality of data content rendering operations;

a container for containing the first specification and the second specification;

means for referencing the container from a data template; and means for dynamically replacing the container by a result of evaluating the first specification and the second specification.

10. The dynamic content retrieval and presentation mechanism according to claim 9, further comprising means for storing the container in a repository, and wherein the means for referencing refers to the stored container.

11. A system for managing dynamic data content in a computing environment, comprising:

means for specifying a transformation flow container ("TFC") which represents at least one data retrieval transformations and a plurality of data styling transformations;

means for including the specified TFC in an authored Web document; and means for evaluating the authored Web document, wherein the evaluation causes a selection of one of the plurality of data styling transformations, and application of the data retrieval transformation and the selected one of the plurality of data styling transformations, thereby replacing the TFC by a result of evaluating the transformations.

12. The system according to claim 11, wherein a selected data retrieval transformation invokes a JavaBean.

13. The system according to claim 11, wherein a selected data styling transformation specifies a style sheet to be applied by a style sheet processing engine.

14. A computer program product for providing dynamic data content management, the computer program product embodied on one or more computer-readable media and comprising:

computer-readable program code for specifying a transformation flow container ("TFC") which represents at least one data retrieval transformations and a plurality of data styling transformations;

computer-readable program code for embedding the specified TFC in an authored Web document; and computer-readable program code for evaluating the authored Web document by selecting a data styling transformation among the plurality of data styling transformations, and applying the selected data styling transformation and the data retrieval transformation, thereby dynamically replacing the TFC by a result of evaluating the transformations.

\* \* \* \* \*